UNITED STATES PATENT OFFICE.

HAROLD S. ASHENHURST, OF CHICAGO, ILLINOIS.

FIREPROOFING MATERIAL.

1,351,149. Specification of Letters Patent. Patented Aug. 31, 1920.

No Drawing. Application filed August 20, 1919. Serial No. 318,801.

*To all whom it may concern:*

Be it known that I, HAROLD S. ASHENHURST, a citizen of the United States, and resident of Chicago, in the county of Cook and State of Illinois, have invented certain new and useful Improvements in Fireproofing Material, of which the following is a specification.

My invention relates to a compound having a high heat resisting capacity adapted to be sprayed or otherwise applied to a surface to be protected.

One of the objects of my invention is to provide a substance which shall be capable of resisting intense heat without change in form, which is not affected by acids, not susceptible to deterioration by exposure to the weather, which may be applied in liquid form and which may be very cheaply manufactured.

The basis of the compound which I employ is manufactured from the asbestos sand which is discharged as waste from asbestos mills. The substance and the method of producing it are fully described and claimed in my co-pending allowed applications, Serial No. 262,953, filed November 18, 1918, and Serial No. 262,954, filed November 18, 1918. From these applications it will be seen that the substance is composed largely of the double silicate of calcium and magnesium and contains an appreciable quantity of a water soluble silicate. The substance is relatively extremely finely divided, no fiber being apparent to the naked eye. It is, however, highly valuable and useful in the compound herein described. To this substance, which is adapted to be shipped in bags or in bulk in dry form, is added a suitable quantity of sodium silicate ($Na_2Si_4O_9$, otherwise known as water-glass) and a sufficient quantity of water to form a readily flowing liquid of substantially the consistency of paint. This substance is adapted to be used with an air spraying device and a highly satisfactory result is secured.

After having been applied either by a brush or a spraying device the material hardens quickly and adheres tenaciously to any surface to which it is applied. It forms a relatively smooth, normally gray or slate colored surface somewhat glassy in appearance and vitreous in character. It is insoluble by acids or water and will resist a high degree of heat without change in form. As a fireproof coating for wood it possesses most striking and highly valuable features. It adheres tightly and even under intense heat will not chip or break down. Under continued high heat the wood beneath it may become charred but it will not ignite. This makes the substance highly valuable as a fireproofing material for use in the construction of wooden buildings. In practice the wooden frame members are coated after having been placed, thereupon the sheeting or siding is applied and suitably coated. Following this the roof trusses are coated and thereafter the outer surface of the roof. A building thus constructed is proof against fire, either external or internal.

The substance is also highly valuable as a coating for steel or iron adapted to be exposed either to the action of chemical fumes or to oxidation by the weather. The substance being impervious to acid or water forms a protective coating which successfully defies the action of the gases which cause the deterioration of iron and steel.

Preferably the compound is formed by mixing five parts sodium silicate and four parts water, by volume, with a suitable quantity of the described finely divided asbestos product in order to make a liquid of substantially the consistency of paint. The substance may be mixed and shipped in cans, kegs or barrels as, due to the relatively large proportion of water, there is no tendency to reaction when air is excluded. Immediately after the material is spread and the atmospheric air is given free access thereto, the excess water is evaporated, the reaction between the silicates of the asbestos product and the water begins and the sodium silicate hardens and binds the whole mass together. By the combined reactions a coating is formed which, as stated, is not attacked by water or acids.

The method of applying the substance is simple, the best results being secured by spraying, by means of air under pressure. This result can not be secured where fiber asbestos is employed for several reasons. By the use of the relatively cheap asbestos residue product I am able to secure the advantages of fire resistance and a surface substantially as smooth as can be secured by the use of paint.

Of course, the substance may be employed to advantage in coating concrete and cement or plaster and so render the same entirely fireproof. It may also be used to coat boards or sheets of composition paper, wood or other fiber.

Obviously the exact proportion specified may not be employed in order to secure advantageous results and I, therefore, do not wish to be limited except as indicated by the appended claims.

I claim:

1. A new composition of matter adapted to be sprayed onto surfaces for fireproofing the same, consisting of sodium silicate, water and the finely divided product formed from the waste of asbestos mills.

2. A new composition of matter adapted for fireproofing, consisting of sodium silicate, water and finely divided waste of asbestos mills containing the double silicate of calcium and magnesium and a soluble silicate.

3. The herein described composition of matter adapted for fireproofing, consisting of substantially five parts sodium silicate, four parts water and a sufficient quantity of the finely divided product manufactured from the waste of asbestos mills to produce a substance of substantially the consistency of paint.

Signed at Chicago, Illinois, this 18th day of August, 1919.

HAROLD S. ASHENHURST.

Witness:
T. D. BUTLER.